United States Patent [19]
Landvik et al.

[11] Patent Number: 6,159,574
[45] Date of Patent: *Dec. 12, 2000

[54] LAMINATED VISCO-ELASTIC SUPPORT

[75] Inventors: Dag Landvik, Saltsjo-Duvnas, Sweden; Michael B. Allaway, Paris, France

[73] Assignee: Fagerdala World Foams AB, Varmdo, Sweden

[ * ] Notice: This patent issued on a continued prosecution application filed under 37 CFR 1.53(d), and is subject to the twenty year patent term provisions of 35 U.S.C. 154(a)(2).

[21] Appl. No.: 08/458,968

[22] Filed: Jun. 2, 1995

(Under 37 CFR 1.47)

[30] Foreign Application Priority Data

Jun. 3, 1994 [GB] United Kingdom ................ 9411120.0

[51] Int. Cl.[7] ................ B32B 5/32; B32B 7/02
[52] U.S. Cl. ................ 428/71; 5/655.9; 5/953; 428/213; 428/217; 428/218; 428/316.6; 428/319.3; 442/221; 442/370
[58] Field of Search ................ 428/316.6, 71, 428/213, 217, 218, 310.5, 319.3; 5/655.9, 740, 953; 442/221, 370

[56] References Cited

U.S. PATENT DOCUMENTS

| | | | |
|---|---|---|---|
| 3,000,010 | 9/1961 | C.F. Lombard et al. | 5/355 |
| 3,047,888 | 8/1962 | Shecter et al. | 428/316.6 X |
| 3,833,259 | 9/1974 | Pershing | 297/452 |
| 4,086,675 | 5/1978 | Talbert et al. | 5/355 |
| 4,190,697 | 2/1980 | Ahrens | 428/316.6 X |
| 4,379,856 | 4/1983 | Samaritter et al. | 428/316.6 X |
| 4,755,411 | 7/1988 | Wing et al. | 428/71 |
| 4,840,430 | 6/1989 | Shimada | 297/452 |
| 4,843,662 | 7/1989 | Handleman | 5/481 |
| 5,031,261 | 7/1991 | Fenner, Sr. | 5/481 |
| 5,189,747 | 3/1993 | Mundy et al. | 5/654 |
| 5,230,947 | 7/1993 | Ou | 428/212 |
| 5,294,181 | 3/1994 | Rose et al. | 297/452.25 |
| 5,522,106 | 6/1996 | Harrison et al. | 5/653 |
| 5,855,415 | 1/1999 | Lilley, Jr. | 297/452.25 |

Primary Examiner—James J. Bell
Assistant Examiner—Blaine R. Copenheaver
Attorney, Agent, or Firm—Michael Best & Fredrickson LLP

[57] ABSTRACT

A laminated support for pressure-relief including an upper layer of visco-elastic foam, a middle layer of visco-elastic foam having a greater hardness, and a bottom layer of highly resilient polyurethane foam. These layers are sandwiched between two layers of reticulated filter polyurethane foam.

20 Claims, 2 Drawing Sheets

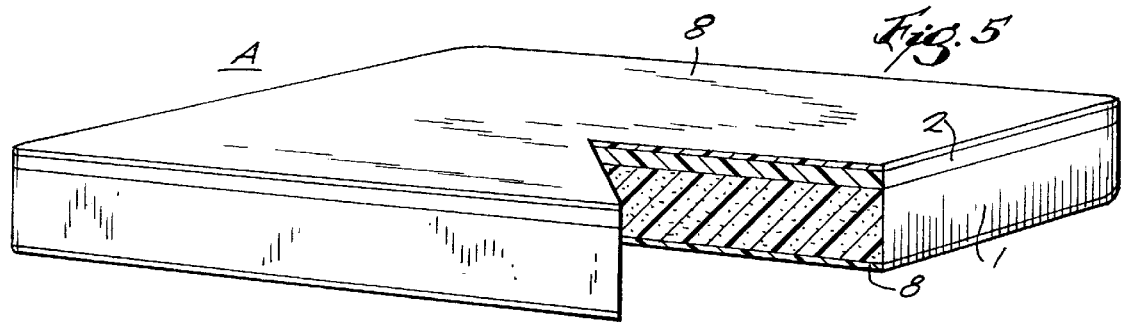
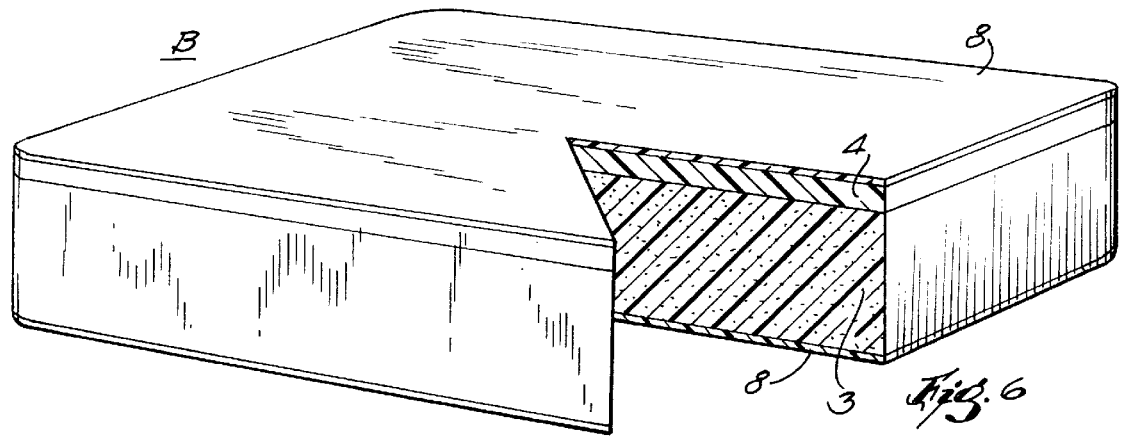
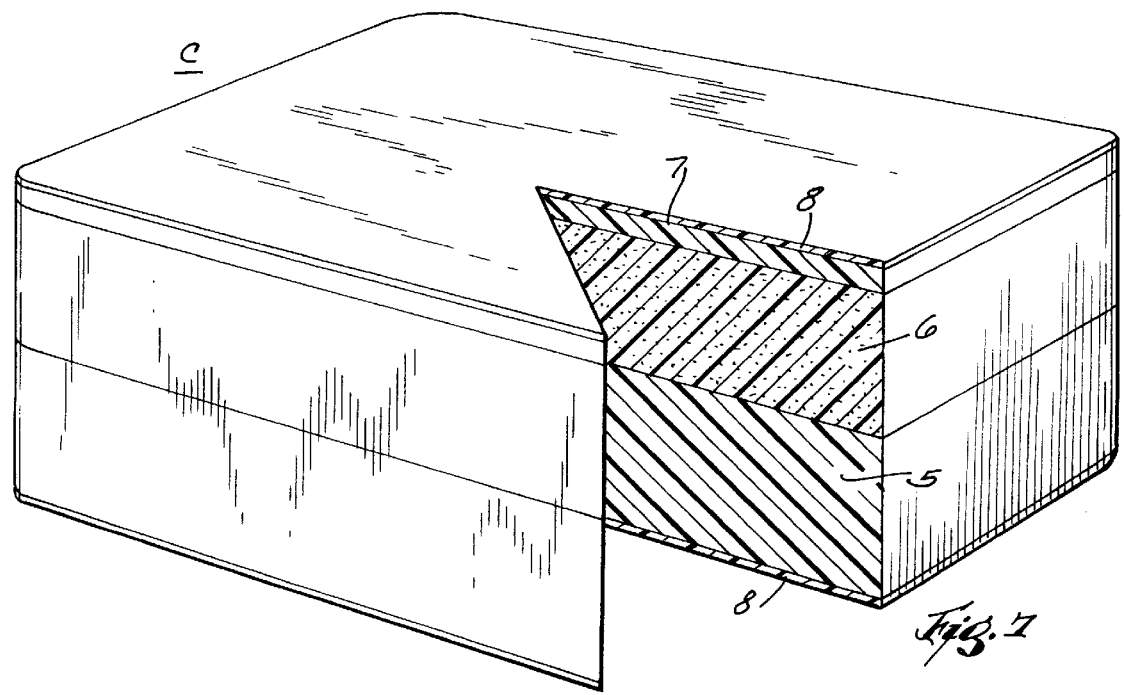

LAMINATED VISCO-ELASTIC SUPPORT

BACKGROUND OF THE INVENTION

1. Technical Field

The invention relates to mattresses and cushions, and more particularly to supports made of visco-elastic material.

2. Related Prior Art

Mattresses and cushions used every day in homes and hospitals are not well-suited for people requiring pressure-relief. In hospital, for example, long-term patients often suffer from pressure sores.

SUMMARY OF THE INVENTION

Known supports made of standard polyurethane foam do not provide even or well-distributed support of a body reclining thereon because of the polyurethane material. Such known standards supports have a spring-like characteristic that tends to return an increased reactive force in response to increasingly large forces on the support. Moreover, the greater the deflection of the polyurethane support, the greater the reactive force provided by the standard support. This spring-like characteristic is undesirable in the case of long-term patient care because the points at which the greatest pressure occurs are the points at which pressure sores can be formed.

Changing the density of the standard polyurethane foam used in such know supports does not improve the performance of such known supports. For example, use of a lower density foam requires a thicker, bulkier cushion or mattress, which can easily become unwieldily or unstable, and can still result in pressure points because of the inherent spring-like nature of the polyurethane foams. Also, if a sufficiently large force is applied to a support made of low density polyurethane foam, it is possible that the force will "bottom out" or act through the support and onto whatever structure lies below or behind the support.

The present invention therefore seeks to provide improved supports, such as mattresses, and cushions, for pressure-relief.

According to the present invention there is provided a laminated support for pressure-relief comprising at least two layers of foam adhered together, wherein at least one layer is a visco-elastic foam.

In one embodiment, the laminated support comprises two layers of visco-elastic foam adhered together, wherein one layer of visco-elastic foam has a greater hardness than the other layer. The laminated support may further comprise a layer of polyurethane foam adhered to one of the layers of visco-elastic foam.

In another embodiment, the laminated support comprises a single layer of visco-elastic foam and a single layer of polyurethane foam adhered together.

The visco-elastic properties of the laminated support respond to a combination of body weight and body temperature. In particular, visco-elastic foam supports tend to soften when heated, and therefore tend to soften in response to body heat. As a result, relatively hard visco-elastic material will initially firmly support a body lying thereon and will soften at the pressure points. Thus, the support subsequently gently molds to the form of the body, allowing pressure to be absorbed uniformly and distributed evenly across the support. This property is of particular benefit in the prevention and healing of pressure sores.

Other features and advantages of the invention will become apparent to those skilled in the art upon review of the following detailed description, claims and drawings.

BRIEF DESCRIPTION OF THE DRAWINGS

FIG. 5 is a perspective view in partial cross section of the support shown in FIG. 1.

FIG. 6 is a perspective view in partial cross section of the support shown in FIG. 2.

FIG. 7 is a perspective view in partial cross section of the support shown in FIG. 3.

Figure 1:
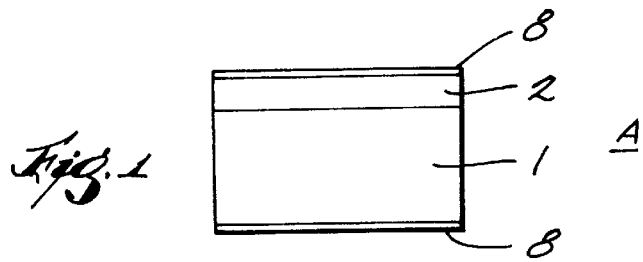
FIG. 1 shows a side view of a support embodying the present invention.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE PREFERRED EMBODIMENT

The support or cushion A shown in FIGS. 1 and 5 includes a bottom layer 1 of 40 mm thick visco-elastic foam having a density of 110 kg/m$^3$ and a hardness of 30 N, and a top layer 2 of 10 mm thick visco-elastic foam having a density of 85 kg/m$^3$ and a hardness of 10 N.

Figure 2:
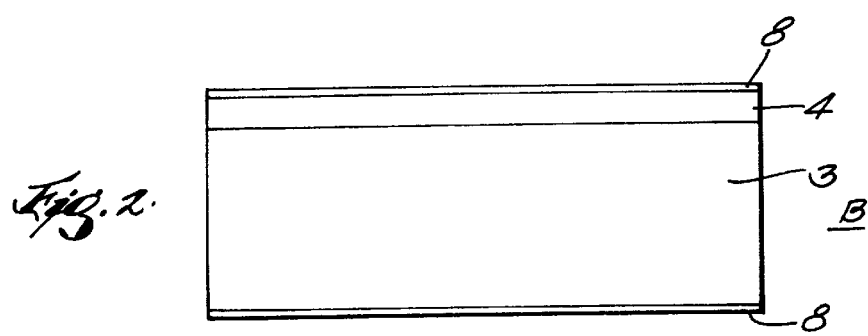
FIG. 2 shows a side view of a support that is an alternative embodiment of the present invention.

The support B shown in FIGS. 2 and 6 is well-suited for use as an overlay which can be placed on top of an existing mattress to provide extra comfort and pressure-relief. The overlay B includes a bottom layer 3 of 60 mm thick visco-elastic foam having a density of 83 kg/m$^3$ and a hardness of 13 N, and a top layer 4 of 10 mm thick visco-elastic foam having a density of 3 kg/m$^3$ and a hardness of 10 N. A support similar to the construction of support B could also be manufactured to include a bottom layer of 80 mm thick highly resilient polyurethane foam having a density of 35 kg/m$^3$ and a hardness of 12 N, and a top layer of 70 mm thick visco-elastic foam having a density of 82 kg/m$^3$ and a hardness of 13 N.

Figure 3:
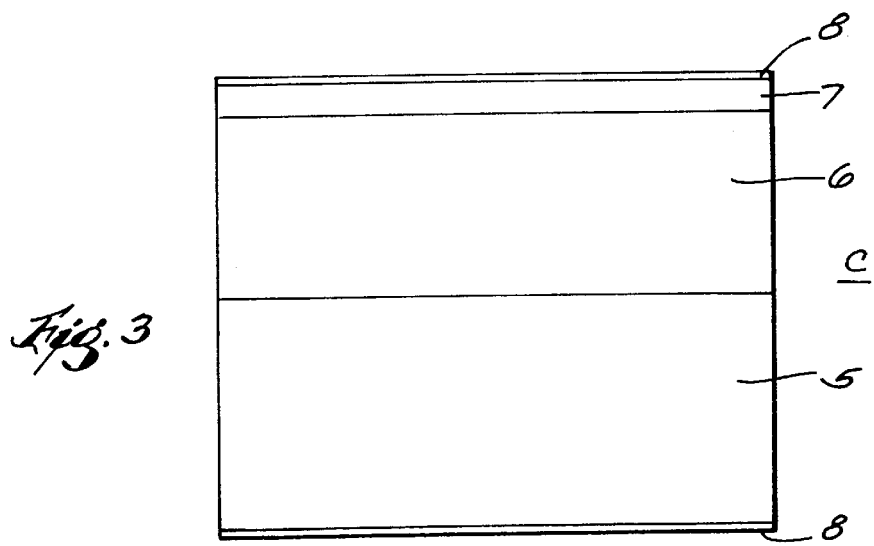
FIG. 3 shows a side view of a support that is a second alternative embodiment of the present invention.

The support C shown in FIGS. 3 and 7 is well-suited for use as an mattress and includes a bottom layer 5 of 75 mm thick polyurethane foam having a density of 35 kg/m$^3$, a middle layer 6 of 60 mm thick visco-elastic foam having a density of 83 kg/m$^3$ and a hardness of 13 N, and a top layer 7 of 10 mm deep visco-elastic foam having a density of 83 kg/m$^3$ and a hardness of 10 N.

Suitable polyurethane foams are manufactured by A/S Dan-Foam, 5560 Arup, Denmark. One example of a polyurethane foam has the manufacturer's code HE35S.

Similarly, suitable visco-elastic foams are made by A/S Dan-Foam, 5560 Arup, Denmark and sold under the trade mark TEMPUR. One such visco-elastic foam has the manufacturer's code T-85. A preferred range of density of the visco-elastic foam is 50 to 120 kg/m$^3$.

For each of the above embodiments A, B, and C, the layers comprising the cushion, overlay or mattress, are adhered together using an environmentally-friendly water-based adhesive such as SABA AQUABOND RSD (trade mark), a two-component water-based adhesive produced by SABA DINXPERLO BV, B-7090 AA DINXPERLO, Belgium. Hardness is to be measured 65% compression at 20° C.

For each of the above embodiments A, B, and C, the layers comprising the cushion, overlay or mattress, once the appropriate layers of foam have been adhered together, a 2 mm thick sheet 8 of a reticulated filter polyurethane foam is adhered to each outer face of the laminated support. This layer 8 is air permeable.

Figure 4:
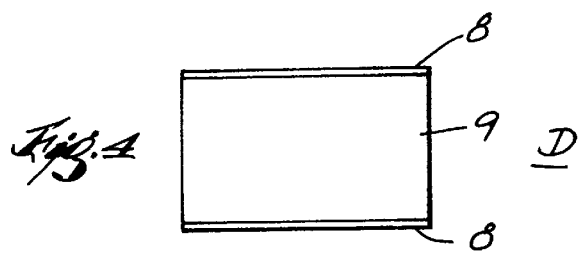
FIG. 4 shows a side view of a support that is a third alternative embodiment of the invention.

The support D illustrated by FIG. 4 includes a single layer of visco-elastic foam sandwiched between two layers of reticulated filter polyurethane foam. In particular, the support D includes a sheet of visco-elastic foam 9, which is sandwiched between two sheets of reticulated polyurethane foam 8. The sheet of visco-elastic foam 9 preferably has a thickness ranging from 50 mm to 150 mm, a density ranging from 50 kg/m$^3$ to 120 kg/m$^3$, and a hardness ranging from ION to 30 N measured at 65% compression at 20° C.

Any of the supports A, B, C, and D may be provided with an outer covering (not shown). Two examples of outer coverings are described below.

One example is a textile net cover followed by a removable outer fabric cover. The textile net cover eases the taking on and off of the fabric cover and is made from a specially treated textile which allows the foam layers to 'breathe' whilst preventing contamination of the foam layers by fluids. An example of such netting is the 100% cotton netting manufactured by BIDET & HORST GmbH & Co KG, D-4460 Hörstel, Germany.

A second example of an outer covering is a waterproof, vapor-permeable cover made of base nylon fabric coated with polyurethane film. Preferably, this cover material is 0.25 mm thick, weights 245 g/m$^2$, and is constructed having a single sheet top surface, no joins, welded seams and a sealed zip flap. In addition, this cover may be pretreated with an anti-bacterial agent.

The laminated support of the present invention, when covered with the polyurethane coat nylon material ensures good hygiene for patients with incontinence. The elasticity of the cover allows the pressure-relieving properties of the visco-elastic foam to be unimpaired.

Laminated supports manufactured in accordance with the present invention allow air to circulate around a patient's skin and thus avoid the discomfort of perspiration and skin irritation.

The visco-elastic foam layers provide the laminated support with its special pressure-relieving properties. The support is thus able to mould according to the weight and temperature of a body in contact therewith. When the body is moved from a particular point of contact, the support quickly regains its initial shape, ready to be re-molded.

This property of the support is different to normally polyurethane foams which bulk up when compressed, thereby exerting pressure rather than relieving it. As a result, the quality of sleep of a person reclining on a support constructed of layers of foam having visco-elastic properties is different to normal polyurethane foams which bulk up when compressed, thereby exerting pressure rather than relieving it.

In use, it is the side of the support which has the visco-elastic foam layer, or the softest visco-elastic foam layer, foremost which is arranged for contact with a person's body. As a result, the support does not need to be turned, as is customary with hospital mattresses, for example.

Various features of the invention are set forth in the following claims.

We claim:

1. A laminated support for pressure-relief; the support comprising:
    a first foam layer having a generally planar first support surface and a generally planar second surface, the first and second surfaces defining therebetween a substantially uniform undeflected thickness, the first layer being made of visco-elastic foam having a density of about 50 to 120 kilograms per cubic meter and a hardness of about 10 to 30 newtons; and
    a second foam layer having a generally planar third surface and a substantially uniform undeflected thickness, the third surface being adhered to the second surface of the first layer, the thickness of the second layer being in the range of four to six times greater than the thickness of the first layer.

2. A laminated support as claimed in claim 1, wherein the first layer is a top layer having a substantially uniform undeflected thickness of about 2 to 10 millimeters.

3. A laminated support as claimed in claim 1, wherein the first layer is a top layer made of visco-elastic foam having a density of about 83 to 85 kilograms per cubic meter and a hardness of about 10 newtons.

4. A laminated support for pressure-relief; the support comprising:
    a first foam layer having a generally planar first support surface and a generally planar second surface, the first and second surfaces defining therebetween a substantially uniform undeflected thickness, the first layer being a top layer made of visco-elastic foam having a density of about 83 to 85 kilograms per cubic meter and a hardness of about 10 to 30 newtons; and
    a second foam layer having a generally planar third surface and a substantially uniform undeflected thickness, the third surface being adhered to the second surface of the first layer, the thickness of the second layer being in the range of four to six times greater than the thickness of the first layer.

5. A laminated support for pressure-relief; the support comprising:
    a first foam layer having a generally planar first support surface and a generally planar second surface, the first and second surfaces defining therebetween a substantially uniform undeflected thickness, the first layer being made of visco-elastic foam having a density of about 83 to 85 kilograms per cubic meter and a hardness of about 10 to 30 newtons; and
    a second foam layer having a generally planar third surface and a substantially uniform undeflected thickness, the third surface being adhered to the second surface of the first layer, the thickness of the second layer being in the range of four to six times greater than the thickness of the first layer, wherein the second layer is a bottom layer made of polyurethane foam having a density of about 35 kilograms per cubic meter and a harness of about 12 newtons.

6. A laminated support for pressure-relief; the support comprising:
    a first foam layer having a generally planar first support surface and a generally planar second surface, the first and second surfaces defining therebetween a substantially uniform undeflected thickness, the first layer being made of visco-elastic foam having a density of about 50 to 120 kilograms per cubic meter and a hardness of about 10 to 30 newtons; and a second foam layer having a generally planar third surface and a substantially uniform undeflected thickness, the third surface being adhered to the second surface of the first layer, the thickness of the second layer being in the range of four to six times greater than the thickness of the first layer, wherein the second layer is a bottom layer made of visco-elastic foam having a hardness 13 newtons.

7. A laminated support for pressure-relief, the support comprising:

a first foam layer having a generally planar first support surface and a generally planar second surface, the first and second surfaces defining therebetween a substantially uniform undeflected thickness, the first layer being made of visco-elastic foam having a density of about 50 to 120 kilograms per cubic meter and a hardness of about 10 to 30 newtons; and a second foam layer having a generally planar third surface and a substantially uniform undeflected thickness, the third surface being adhered to the second surface of the first layer, the thickness of the second layer being in the range of four to six times greater than the thickness of the first layer, wherein the second layer is a bottom layer made of visco-elastic foam having a density of about 110 kilograms per cubic meter and a harness of about 30 newtons.

8. A laminated support for pressure-relief, the support comprising:

a first foam layer having a generally planar first support surface and a generally planar second surface, the first and second surfaces defining therebetween a substantially uniform undeflected thickness, the first layer being made of visco-elastic foam having a density of about 50 to 120 kilograms per cubic meter and a hardness of about 10 to 30 newtons; and a second foam layer having a generally planar third surface and a substantially uniform undeflected thickness, the third surface being adhered to the second surface of the first layer, the thickness of the second layer being in the range of four to six times greater than the thickness of the first layer, wherein the second layer is a bottom layer made of visco-elastic foam having a density of about 83 kilograms per cubic meter and a harness of about 13 newtons.

9. A laminated support for pressure-relief, the support comprising:

a first foam layer having a generally planar first support surface and a generally planar second surface, the first and second surfaces defining therebetween a substantially uniform undeflected thickness, the first layer being made of visco-elastic foam having a density of about 50 to 120 kilograms per cubic meter and a hardness of about 10 to 30 newtons; and a second foam layer having a generally planar third surface and a substantially uniform undeflected thickness, the third surface being adhered to the second surface of the first layer, the thickness of the second layer being in the range of four to six times greater than the thickness of the first layer, wherein the second layer includes a middle layer and a lower layer, wherein the middle layer is made of visco-elastic foam having a density of about 83 kilograms per cubic meter and a harness of about 13 newtons, and wherein the lower layer is made of polyurethane foam having a density of about 35 kilograms per cubic meter.

10. A laminated support for pressure-relief, the support comprising:

a first foam layer having a generally planar first support surface and a generally planar second surface, the first and second surfaces defining therebetween a substantially uniform undeflected thickness, the first layer being made of visco-elastic foam having a density of about 50 to 120 kilograms per cubic meter and a hardness of about 10 to 30 newtons; and a second foam layer having a generally planar third surface and a substantially uniform undeflected thickness, the third surface being adhered to the second surface of the first layer, the thickness of the second layer being in the range of four to six times greater than the thickness of the first layer, and an outer fabric cover constructed of a waterproof, vapor-permeable covering material, wherein the covering material has a substantially uniform thickness of about 0.25 millimeters and a substantially uniform weight of about 245 grams per square meter.

11. A laminated support for pressure-relief, the support comprising:

a first foam top layer having a generally planar first support surface and a generally planar second surface, the first and second surfaces defining therebetween a substantially uniform undeflected thickness, the first layer being made visco-elastic foam;

a second foam layer having a generally planar third surface and a generally planar fourth surface the third and fourth surfaces defining therebetween a substantially uniform undeflected thickness, the second layer being made of visco-elastic foam, the third surface being adhered to the second surface, the second layer having a hardness which is greater than the first layer;

a third foam layer having a generally planar fifth surface, the third layer being made of polyurethane foam, the fifth surface being adhered to the fourth surface;

wherein the second layer has a greater thickness than the first layer and, wherein the third layer has a greater thickness than the second layer; and wherein the first layer and the second layer have respective densities which are substantially equal to each other, such that the first layer and the second layer each have a density of about 85 kilograms per cubic meter and, wherein the third layer has a density which is less than the densities of the first and second layers, such that the third layer has a density of 35 kilograms per cubic meter.

12. A laminated support for pressure-relief, the support comprising:

a first foam layer having a generally planar first support surface and a generally planar second surface, the first and second surfaces defining therebetween a substantially uniform undeflected thickness, the first layer being made of visco-elastic foam; and a second foam layer having a generally planar third surface being adhered to the second surface of the first layer wherein the second layer includes a middle layer and a lower layer, wherein the middle layer is made of visco-elastic foam having a density of about 85 kilograms per cubic meter and a hardness of about 13 newtons, and wherein the lower layer is made of polyurethane foam having a density of about 35 kilograms per cubic meter.

13. A laminated support for pressure-relief, the support comprising:

a first foam layer having a generally planar first support surface and a generally planar second surface, the first and second surfaces defining therebetween a substantially uniform undeflected thickness, the first layer being made of visco-elastic foam;

a second foam layer having a generally planar third surface being adhered to the second surface of the first layer; and an outer fabric cover constructed of a waterproof, vapor-permeable covering material, and wherein the covering material has a substantially uniform thickness of about 0.25 millimeters and a substantially uniform weight of about 245 grams per square meter.

14. A laminated support as claimed in claim 1, wherein the first layer includes a top layer and a bottom layer.

15. A laminated support as claimed in claim 1, wherein the laminated support is further provided with an outer fabric cover constructed of a waterproof, vapor-permeable covering material.

16. A laminated support as claimed in claim 15, wherein the covering material is made of base nylon fabric coated with polyurethane film.

17. A laminated support as claimed in claim 15, wherein the covering material has a substantially uniform thickness of about 0.25 millimeters and a substantially uniform weight of about 245 grams per square meter.

18. A laminated support as claimed in claim 15, wherein the outer fabric cover is pretreated with an anti-bacterial agent.

19. A laminated support for pressure-relief, the support comprising:

a first foam layer having a generally planar first support surface and a generally planar second surface, the first and second surfaces defining therebetween a substantially uniform undeflected thickness of about 10 millimeters, the first layer being made of visco-elastic foam having a density of about 50 to 120 kilograms per cubic meter and a hardness of about 10 to 30 newtons; and a second foam layer having a generally planar third surface and a substantially uniform undeflected thickness, the third surface being adhered to the second surface of the first layer, the second layer being made of a visco-elastic foam having a density greater than the density of the first layer, and the second layer having a thickness in the range of 40 to 60 millimeters.

20. A laminated support for pressure-relief, the support comprising:

a first foam layer having a generally planar first support surface and a generally planar second surface, the first and second surfaces defining therebetween a substantially uniform undeflected thickness of about 10 millimeters, the first layer being made of visco-elastic foam having a density of about 50 to 120 kilograms per cubic meter and a hardness of about 10 to 30 newtons; and a second foam layer having a generally planar third surface and a substantially uniform undeflected thickness, the third surface being adhered to the second surface of the first layer, the second foam layer including a middle layer and a bottom layer, the middle layer having a substantially uniform undeflected thickness and being made of a visco-elastic foam having a hardness greater than the hardness of the first layer, the thickness of the middle layer being 60 millimeters, and the bottom layer having a substantially uniform undeflected thickness and being made of a polyurethane foam having a density less than the density of the first layer, the thickness of the bottom layer being 75 millimeters.

* * * * *

UNITED STATES PATENT AND TRADEMARK OFFICE
CERTIFICATE OF CORRECTION

PATENT NO. : 6,159,574
DATED : December 12, 2000
INVENTOR(S) : Dag Landvik and Michael B. Allaway It is certified that error appears in the above-identified patent and that said Letters Patent is hereby corrected as shown below:

Title page,
Item [56] References Cited, U.S. PATENT DOCUMENTS, the first listed patent number "3,000,010" should read -- 3,000,020 --.
*Attorney, Agent, or Firm* "Michael Best & Fredrickson LLP" should read -- Michael Best & Friedrich LLP --.

Column 2,
Line 42, "3 kg/m$^3$" should read -- 83 kg/m$^3$ --.

Column 3,
Line 20, "ION" should read -- 10 N --.

Columns 4, 5, 6, 7 and 8,
Please delete claims 1-20, and insert allowed claims 1-13 as follows, -- 1. A laminated support for pressure-relief, the support comprising:

a first foam layer having a generally planar first support surface and a generally planar second surface, the first and second surfaces defining therebetween a substantially uniform undeflected thickness of about 10 millimeters, the first layer being made of visco-elastic foam having a density of about 50 to 120 kilograms per cubic meter and a hardness of about 10 to 30 newtons; and a second foam layer having a generally planar third surface and a substantially uniform undeflected thickness, the third surface being adhered to the second surface of the first layer, the second layer being made of a visco-elastic foam having a density greater than the density of the first layer, and the second layer having a thickness in the range of 40 to 60 millimeters.

2. A laminated support for pressure-relief, the support comprising:

a first foam layer having a generally planar first support surface and a generally planar second surface, the first and second surfaces defining therebetween a substantially uniform undeflected thickness of about 10 millimeters, the first layer being made of visco-elastic foam having a density of about 50 to 120 kilograms per cubic meter and a hardness of about 10 to 30 newtons; and a second foam layer having a generally planar third surface and a substantially uniform undeflected thickness, the third surface being adhered to the second surface of the first layer, the second foam layer including a middle layer and a bottom layer, the middle layer having a substantially uniform undeflected thickness and being made of a visco-elastic foam having a hardness greater than the hardness of the first layer, the thickness of the middle layer being 60 millimeters, and the bottom layer having a substantially uniform undeflected thickness and being made of a polyurethane foam having a density less than the density of the first layer, the thickness of the bottom layer being 75 millimeters.

UNITED STATES PATENT AND TRADEMARK OFFICE
CERTIFICATE OF CORRECTION

PATENT NO. : 6,159,574
DATED : December 12, 2000
INVENTOR(S) : Dag Landvik and Michael B. Allaway It is certified that error appears in the above-identified patent and that said Letters Patent is hereby corrected as shown below:

3. A laminated support for pressure-relief, the support comprising:
a first foam top layer having a generally planar first support surface and a generally planar second surface, the first and second surfaces defining therebetween a substantially uniform undeflected thickness, the first layer being made of visco-elastic foam, the first layer having a density of about 85 kilograms per cubic meter;
a second foam layer having a generally planar third surface and a generally planar fourth surface, the third and fourth surfaces defining therebetween a substantially uniform undeflected thickness, the second layer being made of visco-elastic foam, the second layer having a density of about 85 kilograms per cubic meter, the third surface being adhered to the second surface, the second layer having a hardness which is greater than the first layer;
a third foam layer having generally planar fifth surface, the third layer being made of polyurethane foam, the third layer having a density of about 35 kilograms per cubic meter, the fifth surface being adhered to the fourth surface; and
wherein the second layer has a greater thickness than the first layer and, wherein the third layer has a greater thickness than the second layer.

4. A laminated support for pressure-relief, the support comprising:
a first foam layer having a generally planar first support surface and a generally planar second surface, the first and second surfaces defining therebetween a substantially uniform undeflected thickness, the first layer being a top layer made of visco-elastic foam having a density of about 83 to 85 kilograms per cubic meter and a hardness of about 10 newtons; and
a second foam layer having a generally planar third surface and a substantially uniform undeflected thickness, the third surface being adhered to the second surface of the first layer, the thickness of the second layer being in the range of four to six times greater than the thickness of the first layer.

5. A laminated support for pressure-relief, the support comprising:
a first foam layer having a generally planar first support surface and a generally planar second surface, the first and second surfaces defining therebetween a substantially uniform undeflected thickness, the first layer being made of visco-elastic foam having a density of about 50 to 120 kilograms per cubic meter and a hardness of about 10 to 30 newtons; and
a second foam layer having a generally planar third surface and a substantially uniform undeflected thickness, the third surface being adhered to the second surface of the first layer, the thickness of the second layer being in the range of four to six times greater than the thickness of the first layer, wherein the second layer is a bottom layer made of polyurethane foam having a density of about 35 kilograms per cubic meter and a hardness of about 12 newtons.

UNITED STATES PATENT AND TRADEMARK OFFICE
CERTIFICATE OF CORRECTION

PATENT NO. : 6,159,574
DATED : December 12, 2000
INVENTOR(S) : Dag Landvik and Michael B. Allaway It is certified that error appears in the above-identified patent and that said Letters Patent is hereby corrected as shown below:

6. A laminated support for pressure-relief, the support comprising:
a first foam layer having a generally planar first support surface and a generally planar second surface, the first and second surfaces defining therebetween a substantially uniform undeflected thickness, the first layer being made of visco-elastic foam having a density of about 50 to 120 kilograms per cubic meter and a hardness of about 10 to 30 newtons; and
a second foam layer having a generally planar third surface and a substantially uniform undeflected thickness, the third surface being adhered to the second surface of the first layer, the thickness of the second layer being in the range of four to six times greater that the thickness of the first layer, wherein the second layer is a bottom layer made of visco-elastic foam having a hardness of 13 newtons.

7. A laminated support for pressure-relief, the support comprising:
a first foam layer having a generally planar first support surface and a generally planar second surface, the first and second surfaces defining therebetween a substantially uniform undeflected thickness, the first layer being made of visco-elastic foam having a density of about 50 to 120 kilograms per cubic meter and a hardness of about 10 to 30 newtons; and
a second foam layer having a generally planar third surface and a substantially uniform undeflected thickness, the third surface being adhered to the second surface of the first layer, the thickness of the second layer being in the range of four to six times greater than the thickness of the first layer, wherein the second layer is a bottom layer made of visco-elastic foam having a density of about 110 kilograms per cubic meter and a hardness of about 30 newtons.

8. A laminated support for pressure-relief, the support comprising:
a first foam layer having a generally planar first support surface and a generally planar second surface, the first and second surfaces defining therebetween a substantially uniform undeflected thickness, the first layer being made of visco-elastic foam having a density of about 50 to 120 kilograms per cubic meter and a hardness of about 10 to 30 newtons; and
a second foam layer having a generally planar third surface and a substantially uniform undeflected thickness, the third surface being adhered to the second surface of the first layer, the thickness of the second layer being in the range of four to six times greater than the thickness of the first layer, wherein the second layer is a bottom layer made of visco-elastic foam having a density of about 83 kilograms per cubic meter and a hardness of about 13 newtons.

UNITED STATES PATENT AND TRADEMARK OFFICE
CERTIFICATE OF CORRECTION

PATENT NO. : 6,159,574
DATED : December 12, 2000
INVENTOR(S) : Dag Landvik and Michael B. Allaway It is certified that error appears in the above-identified patent and that said Letters Patent is hereby corrected as shown below:

9.    A laminated support for pressure-relief, the support comprising:
a first foam layer having a generally planar first support surface and a generally planar second surface, the first and second surfaces defining therebetween a substantially uniform undeflected thickness, the first layer being made of visco-elastic foam having a density of about 50 to 120 kilograms per cubic meter and a hardness of about 10 to 30 newtons; and
a second foam layer having a generally planar third surface and a substantially uniform undeflected thickness, the third surface being adhered to the second surface of the first layer, the thickness of the second layer being in the range of four to six times greater than the thickness of the first layer, wherein the second layer includes a middle layer and a lower layer, wherein the middle layer is made of visco-elastic foam having a density of about 83 kilograms per cubic meter and a hardness of about 13 newtons, and wherein the lower layer is made of polyurethane foam having a density of about 35 kilograms per cubic meter.

10.    A laminated support for pressure-relief, the support comprising:
a first foam layer having a generally planar first support surface and a generally planar second surface, the first and second surfaces defining therebetween a substantially uniform undeflected thickness, the first layer being made of visco-elastic foam having a density of about 50 to 120 kilograms per cubic meter and a hardness of about 10 to 30 newtons;
a second foam layer having a generally planar third surface and a substantially uniform undeflected thickness, the third surface being adhered to the second surface of the first layer, the thickness of the second layer being in the range of four to six times greater than the thickness of the first layer; and
an outer fabric cover contructed of a waterproof, vapor-permeable covering material, wherein the covering material has a substantially uniform thickness of about 0.25 millimeters and a substantially uniform weight of about 245 grams per square meter.

UNITED STATES PATENT AND TRADEMARK OFFICE
CERTIFICATE OF CORRECTION

PATENT NO. : 6,159,574
DATED : December 12, 2000
INVENTOR(S) : Dag Landvik and Michael B. Allaway It is certified that error appears in the above-identified patent and that said Letters Patent is hereby corrected as shown below:

11. A laminated support for pressure-relief, the support comprising:
a first foam top layer having a generally planar first support surface and a generally planar second surface, the first and second surfaces defining therebetween a substantially uniform undeflected thickness, the first layer being made of visco-elastic foam;
a second foam layer having a generally planar third surface and a generally planar fourth surface, the third and fourth surfaces defining therebetween a substantially uniform undeflected thickness, the second layer being made of visco-elastic foam, the third surface being adhered to the second surface, the second layer having a hardness which is a greater than the first layer;
a third foam layer having a generally planar fifth surface, the third layer being made of polyurethane foam, the fifth surface being adhered to the fourth surface;
wherein the second layer has a greater thickness than the first layer and, wherein the third layer has a greater thickness than the second layer; and
wherein the first layer and the second layer have respective densities which are substantially equal to each other, such that the first layer and the second layer each have a density of about 85 kilograms per cubic meter and, wherein the third layer has a density which is less than the densities of the first and second layers, such that the third layer has a density of 35 kilograms per cubic meter.

12. A laminated support for pressure-relief, the support comprising:
a first foam layer having a generally planar first support surface and a generally planar second surface, the first and second surfaces defining therebetween a substantially uniform undeflected thickness, the first layer being made of visco-elastic foam; and
a second foam layer having a generally planar third surface being adhered to the second surface of the first layer, wherein the second layer includes a middle layer and a lower layer, wherein the middle layer is made of visco-elastic foam having a density of about 85 kilograms per cubic meter and a hardness of about 13 newtons, and wherein the lower layer is made of polyurethane foam having a density of about 35 kilograms per cubic meter.

UNITED STATES PATENT AND TRADEMARK OFFICE
CERTIFICATE OF CORRECTION

PATENT NO.   : 6,159,574
DATED        : December 12, 2000
INVENTOR(S)  : Dag Landvik and Michael B. Allaway It is certified that error appears in the above-identified patent and that said Letters Patent is hereby corrected as shown below:

13.  A laminated support for pressure-relief, the support comprising:
a first foam layer having a generally planar first support surface and a generally planar second surface, the first and second surfaces defining therebetween a substantially uniform undeflected thickness, the first layer being made of visco-elastic foam;
a second foam layer having a generally planar third surface being adhered to the second surface of the first layer; and
an outer fabric cover constructed of a waterproof, vapor-permeable covering material, and wherein the covering material has a substantially uniform thickness of about 0.25 millimeters and a substantially uniform weight of about 245 grams per square meter. --

Signed and Sealed this

Nineteenth Day of March, 2002

*Attest:*

JAMES E. ROGAN
*Director of the United States Patent and Trademark Office*

*Attesting Officer*